US012140905B2

(12) United States Patent
Yamashita et al.

(10) Patent No.: US 12,140,905 B2
(45) Date of Patent: Nov. 12, 2024

(54) METHOD FOR PRODUCING A TONER

(71) Applicant: CANON KABUSHIKI KAISHA, Tokyo (JP)

(72) Inventors: Shohei Yamashita, Tokyo (JP); Takeshi Tsujino, Shizuoka (JP); Junya Asaoka, Shizuoka (JP); Yuu Sasano, Shizuoka (JP); Yuhei Terui, Shizuoka (JP); Koki Inoue, Shizuoka (JP); Shota Amano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 456 days.

(21) Appl. No.: 17/336,386

(22) Filed: Jun. 2, 2021

(65) Prior Publication Data

US 2021/0382406 A1 Dec. 9, 2021

(30) Foreign Application Priority Data

Jun. 8, 2020 (JP) ................................. 2020-099401

(51) Int. Cl.
*G03G 9/08* (2006.01)
*G03G 9/087* (2006.01)
*G03G 9/097* (2006.01)

(52) U.S. Cl.
CPC ......... *G03G 9/0804* (2013.01); *G03G 9/0819* (2013.01); *G03G 9/08711* (2013.01); *G03G 9/09708* (2013.01)

(58) Field of Classification Search
CPC ........................... G03G 9/0804; G03G 9/0815
See application file for complete search history.

(56) References Cited

U.S. PATENT DOCUMENTS

| | | | |
|---|---|---|---|
| 6,309,788 | B1 | 10/2001 | Tsuji et al. |
| 6,953,648 | B2 | 10/2005 | Tsujino et al. |
| 7,494,758 | B2 | 2/2009 | Tsujino et al. |
| 8,440,382 | B2 | 5/2013 | Isono et al. |
| 8,497,054 | B2 | 7/2013 | Sugiyama et al. |
| 8,545,133 | B2 | 10/2013 | Fumita et al. |
| 8,652,725 | B2 | 2/2014 | Watanabe et al. |
| 8,652,737 | B2 | 2/2014 | Handa et al. |
| 8,778,581 | B2 | 7/2014 | Nonaka et al. |
| 8,916,319 | B2 | 12/2014 | Ikeda et al. |
| 8,940,467 | B2 | 1/2015 | Hashimoto et al. |
| 9,229,345 | B2 | 1/2016 | Ikeda et al. |
| 9,341,967 | B2 | 5/2016 | Tsujino et al. |
| 9,366,981 | B2 | 6/2016 | Yamawaki et al. |
| 9,632,441 | B2 | 4/2017 | Abe et al. |
| 9,658,551 | B2 | 5/2017 | Terui et al. |
| 9,785,077 | B2 | 10/2017 | Abe et al. |
| 9,829,814 | B2 | 11/2017 | Yoshida et al. |
| 9,857,711 | B2 | 1/2018 | Yoshida et al. |
| 9,964,879 | B2 | 5/2018 | Terui et al. |
| 10,012,922 | B2 | 7/2018 | Yoshida et al. |
| 10,078,285 | B2 | 9/2018 | Kubo et al. |
| 10,295,922 | B2 | 5/2019 | Terui et al. |
| 10,678,155 | B2 | 6/2020 | Terui et al. |
| 10,747,133 | B2 | 8/2020 | Yagi et al. |
| 10,747,136 | B2 | 8/2020 | Kenmoku et al. |
| 10,852,650 | B2 | 12/2020 | Inoue et al. |
| 2011/0177452 | A1* | 7/2011 | Hosoya ................ G03G 9/0975 430/137.22 |
| 2012/0251936 | A1 | 10/2012 | Hamano |
| 2020/0292953 | A1 | 9/2020 | Nakayama et al. |
| 2020/0292956 | A1 | 9/2020 | Amano et al. |
| 2021/0063901 | A1 | 3/2021 | Terui et al. |
| 2021/0063902 | A1 | 3/2021 | Inoue et al. |

FOREIGN PATENT DOCUMENTS

| | | | | |
|---|---|---|---|---|
| JP | 2006-072120 | * | 3/2006 | ............... G03G 9/08 |
| JP | 2006-220674 | A | 8/2006 | |
| JP | 2009-139590 | * | 6/2009 | .............. G03G 9/08 |
| JP | 2012-203368 | A | 10/2012 | |
| JP | 2017-134164 | A | 8/2017 | |

OTHER PUBLICATIONS

Translation of JP 2009-139590.*
Translation of JP 2006-072120.*
U.S. Appl. No. 17/222,127, Yuhei Terui, filed Apr. 5, 2021.
U.S. Appl. No. 17/377,495, Shota Amano, filed Jul. 16, 2021.

* cited by examiner

*Primary Examiner* — Peter L Vajda
(74) *Attorney, Agent, or Firm* — VENABLE LLP

(57) ABSTRACT

A production method of a toner having a toner particle that contains a binder resin and an external additive that is externally added to the toner particle, wherein the production method has a toner particle dispersion step of obtaining a toner particle dispersion by dispersing the toner particle and an inorganic dispersant in an aqueous medium; and an external addition step of externally adding the external additive to the toner particle through addition of the external additive to the toner particle dispersion.

14 Claims, No Drawings

METHOD FOR PRODUCING A TONER

BACKGROUND OF THE INVENTION

Field of the Invention

The present disclosure relates to a method for producing a toner that is used for instance in electrophotographic methods, electrostatic recording methods and magnetic recording methods.

Description of the Related Art

In recent years, electrophotographic devices such as copiers and printers, which have become widespread worldwide, have come to be used in various environments, both indoors and outdoors. A demand has arisen aimed at prolonging the life of these devices, without incurring in image deterioration over long periods of time, and while coping with various such environments. In order to prolong device life it is important to suppress changes derived from durable use of a toner. Means for curtailing changes derived from durable use include for instance selecting inorganic fine particles of large particle diameter as inorganic fine particles that are externally added to the surface of a toner particle, and firmly fixing inorganic fine particles, and making fixing strength more uniform.

Unlike small-size inorganic fine particles, large-size inorganic fine particles are less prone to become buried in the toner particle surface for instance on account of stress from a toner transport member or a regulating blade. On the other hand, however, large-size inorganic fine particles tend to be insufficiently fixed to the toner particle. Upon continued stirring for a long time within a device such as a printer, the ensuing strong stress may cause large-size inorganic fine particles to detach from the toner particle and migrate to other members, whereby the function of the inorganic fine particles as spacer particles is lost. A concern arises as a result in that attachment forces on the on the toner surface may increase, and transferability may drop over long-term use.

By detaching from the toner particle surface, such large-size inorganic fine particles may adhere as a result onto a developing roller after printing of a large number of prints, for instance in a printer, in high-temperature, high-humidity environments. Melt adhesion of the toner is triggered thereby, which results in the problem of the occurrence of development streaks.

Meanwhile, a flowability-imparting ability of spacer particles, so-called bearing effect, may conversely be lost when some of the large-size inorganic fine particles are caused to be strongly fixed through burying into the toner particle. As a result, the flowability of the toner drops, and rubbing between a control member and a toner carrying member is less likely to progress uniformly.

Effective and uniform charging is insufficient in consequence in high-temperature, high-humidity environments, which may give rise to a decrease in image density and to the phenomenon, referred to as fogging, in which toner having a low charge quantity is developed in a non-image region of an electrostatic latent image bearing member.

External addition methods for causing inorganic fine particles, organic fine particles and composite fine particles of the foregoing to be fixed to a toner particle surface include dry-type external addition and wet-type external addition. The former is widely used as a method for external addition on a toner particle, but entails the concern of local rises in temperature, since the external additive becomes embedded mainly on account of physical impacts between the toner particle and a blade rotating at high speed against a dry powder.

When the toner particle surface heats up, the external additive generally becomes strongly lodged in, on account of softening of the resin in the vicinity of the toner particle surface. In consequence, uniform external addition may be hindered by local rises in the temperature of the toner particle. A further concern is the impact on member contamination and on fixing performance derived for instance from exudation and changes in the crystallinity of a release agent component contained in the toner particle. In particular the impact of heat is deemed to be pronounced in toner production methods such as pulverization in which the release agent component becomes readily exposed on the toner particle surface.

In the latter method, by contrast, the toner particle is less susceptible to the impact of heat, since in this case external addition is accomplished in an aqueous field. In order to perform uniform external addition in an aqueous field it is however necessary to disperse the toner particle uniformly. In particular, a separate step of re-slurrying in an aqueous field becomes necessary, and the method involved is thus important, in a case where no aqueous field is used in the production process of the toner particle, or in a case where external addition is performed on a toner particle having been dried once.

Methods for toner particle dispersion attempted thus far include methods that involve mixing an organic solvent (for instance Japanese Patent Application Publication No. 2012-203368), methods that involve using a surfactant (for instance Japanese Patent Application Publication No. 2006-220674), and combinations of the foregoing.

SUMMARY OF THE INVENTION

In a case however where an organic solvent is used, concerns arise in terms of the impact on the toner surface derived from changes in polarity and the impact on a low-melting point release agent derived from heating for removal. Moreover, the surfactant is difficult to remove completely by washing with water. This gives rise to the concern of fogging caused by an increase in the hygroscopicity of the toner and by a drop in the charge quantity of the toner in high-temperature, high-humidity environments.

Conventional methods have thus room for improvement in that fogging and streaks occur, and transferability is not sufficiently maintained, upon long-term use of a printer in harsh environments such as high-temperature, high-humidity environments. At least one aspect of the present disclosure is directed to providing a toner production method that allows maintaining transferability, with less likely occurrence of fogging or streaks, also over long-term use of a printer in harsh environments such as high-temperature, high-humidity environments.

According to one aspect of the present disclosure, there is provided a method for producing a toner comprising a toner particle comprising a binder resin, and an external additive externally added to the toner particle, the production method comprising the steps of:

dispersing the toner particle and an inorganic dispersant in an aqueous medium to obtain an aqueous dispersion of the toner particle; and adding the external additive to the aqueous dispersion and fixing the external additive to the toner particle in the aqueous dispersion.

The present disclosure succeeds in providing a toner production method that allows maintaining transferability, with less likely occurrence of fogging or streaks, also over long-term use of a printer in harsh environments such as high-temperature, high-humidity environments. Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The inventors diligently studied a toner production method that allows maintaining transferability and in which fogging and streaks are less likely to occur, even when a printer is used for a long period of time in a high-temperature, high-humidity environment. As described above, it is important to curtail changes in toner derived from durable use in order to preclude degradation of images in long periods of time upon long-term use in harsh environment such as high-temperature, high-humidity environments. It is deemed that the element most affected over durable use is the external additive that is fixed to the surface of the toner particle and that is acted upon by direct stress from members. Therefore, the inventors addressed first an external addition method for the purpose of allowing an external additive to be fixed uniformly and firmly.

Dry-type external addition was assessed first as the external addition method. Studies by the inventors have revealed that the external additive can be fixed firmly as a result of collisions and shear elicited by toner and blades, but that variability arises depending on the embedding condition of the external additive in the toner particle. The inventors inferred the following as regards this finding.

In dry-type external addition the external additive becomes embedded mainly on account of physical impacts between blades rotating at high speed and the toner particle, and it is found that high temperature is generated locally and instantaneously as a result. When the surface of the toner particle heats up, the external additive is generally pushed in strongly on account of softening of the toner particle surface. It is therefore deemed that in consequence uniform external addition is hindered by the local rise in the temperature of the toner particle.

A further concern is the influence that the rise in the temperature of the toner particle exerts on a plasticizer component contained in the toner particle. This conceivably includes for instance exudation of the plasticizer component onto the toner particle surface, and member contamination derived from blooming of the plasticizer component compatibilized with the binder resin. In view of the above results, the inventors studied next wet-type external addition, with the aim of making fixing strength more uniform and reducing the impact on the plasticizer component. It was found that by performing wet-type external addition mainly in a water-based field, there occurred no problems such as local rises in temperature or exudation of the plasticizer component, which are issues of dry-type external addition, and that also fixing strength uniformity could be increased with respect to that of dry-type external addition.

It was however found that the performance of the toner is affected by the toner particle dispersion method at the time of wet-type external addition. In a case for instance where an organic solvent is used to disperse the toner particle, hydrophobic components tend to be skewed toward the surface of the toner particle, and plasticizer exudation is prone to occur, given that the polarity of the solvent is lower than that of water. In a case where a surfactant is used for dispersing the toner particle it is difficult to completely remove the surfactant by washing with water, since the hydrophobic moiety of the surfactant has affinity with the toner particle surface. In a case where the surfactant remains on the surface of the toner particle, the hygroscopicity of the toner particle surface increases, and the charge quantity of the toner decreases in high-temperature, high-humidity environments, all of which gives rise to fogging.

The inventors found therefore that surface morphology is preserved during formation of the toner particle, while allowing an external additive to stick firmly and uniformly, and with lessened susceptibility to environmental impact, by dispersing the toner particle using an inorganic dispersant and by performing wet-type external addition.

That is, according to one aspect of the present disclosure, there is provided a method for producing a toner comprising a toner particle comprising a binder resin, and an external additive externally added to the toner particle, the production method comprising the steps of:

dispersing the toner particle and an inorganic dispersant in an aqueous medium to obtain an aqueous dispersion of the toner particle; and adding the external additive to the aqueous dispersion and fixing the external additive to the toner particle in the aqueous dispersion.

Preferably, a volume-basis median diameter (D50) of the inorganic dispersant used for dispersing the toner particle is from 30 nm to 200 nm, more preferably from 80 nm to 120 nm. When the D50 of the inorganic dispersant is 30 nm or more, aggregation between particles of the inorganic dispersant is moderate, and the inorganic dispersant readily covers the surface of the toner particle uniformly, since in that case steric hindrance on the toner particle surface is less likely. Similarly, when the D50 of the inorganic dispersant is 200 nm or less, the toner surface is uniformly covered readily, in terms of steric hindrance, and dispersibility of the toner particle in solvents is improved.

The D50 of the inorganic dispersant can be controlled on the basis of for instance the temperature and rotational speed of stirring at the time of generation of the inorganic dispersant, and on the basis of the concentration of the inorganic dispersant. Herein D50 tends to decrease with lower temperatures, higher rotational speeds and higher concentration of the dispersant.

The inorganic dispersant causes the toner particle to disperse in an aqueous medium. A known inorganic salt, inorganic oxide or the like can be used as the inorganic dispersant. The inorganic dispersant is preferably particles of an inorganic dispersant. The inorganic dispersant is preferably an inorganic salt. More preferably, the inorganic dispersant contains a polyvalent metal salt of phosphoric acid. More preferably, the inorganic dispersant is at least one polyvalent metal salt of phosphoric acid selected from the group consisting of tricalcium phosphate, magnesium phosphate, aluminum phosphate and zinc phosphate.

In a case where any of these inorganic dispersants is utilized, the agent may be added as-is into the aqueous medium, but in order to obtain finer particles the inorganic dispersant may be used by being prepared in the aqueous medium through the use of a compound that is capable of generating the inorganic dispersant. In the case for instance of tricalcium phosphate, water-insoluble tricalcium phosphate can be produced by mixing an aqueous solution of sodium phosphate and an aqueous solution of calcium chloride while under high-speed stirring; this allows for a more uniform and finer dispersion. These inorganic dispersants can be almost completely removed through dissolution by addition of an acid or alkali.

That is, the toner particle dispersion step (the step of dispersing) more preferably includes a step of mixing an aqueous solution of sodium phosphate and an aqueous solution of calcium chloride, under stirring, to prepare an aqueous medium in which fine particles of tricalcium phosphate are dispersed, and a step of dispersing the toner particle in the aqueous medium, to obtain a toner particle dispersion (an aqueous dispersion of the toner particle).

The aqueous medium contains water. Preferably, the aqueous medium is water. Other components such as a pH adjusting agent may be incorporated so long as the above effect is not impaired. Preferably, the aqueous medium contains substantially no organic solvent. The content of the organic solvent in the aqueous medium is preferably 10 mass % or less, or 5 mass % or less, or 3 mass % or less, or 1 mass % or less, or 0.5 mass % or less, or 0.1 mass % or less. Particularly preferably, the content is 0 mass %.

Preferably, the aqueous medium contains substantially no surfactant. The content of the surfactant in the aqueous medium is preferably 0.01 mass % or less, or 0.001 mass % or less, or 0.0001 mass % or less, or 0.00001 mass % or less, or 0.000001 mass % or less. Particularly preferably, the content is 0 mass %.

For the purpose of bringing out a sufficient spacer effect, the external additive preferably includes an external additive having a number-average particle diameter of primary particles from 100 nm to 300 nm (more preferably, from 150 nm to 250 nm). The number-average particle diameter of primary particles of the external additive is more preferably from 100 nm to 300 nm, and yet more preferably from 150 nm to 250 nm.

When the number-average particle diameter of the external additive is 100 nm or more, a sufficient protrusion height can be maintained through embedding when the external additive becomes fixed to the toner particle, whereby the effect of the external additive as a spacer is rendered more pronounced. When the number-average particle diameter of the external additive is 300 nm or less, the protrusion height and the protrusion surface area of the external additive are more suitable upon fixing onto the toner particle surface. When stress acts on the toner, therefore, the toner particle does not readily receive forces in the tangent direction, and the external additive is less likely to detach from the toner particle surface.

The external additive is preferably inorganic fine particles or organic-inorganic composite fine particles. Stable and good transferability can be achieved over long periods of time by performing wet-type external addition using an external additive having a particle diameter lying in the above range.

With the external additive having a number-average particle diameter (D1) of primary particles in the range from 100 nm to 300 nm there may be concomitantly used another external additive having a smaller particle diameter. Charging performance and flowability can be readily controlled by using external additives having different particle diameters. When using concomitantly external additives there are preferably used an external additive having a number-average particle diameter (D1) from 100 nm to 300 nm and an external additive having a number-average particle diameter (D1) smaller than 100 nm.

Preferably, the external additive is at least one selected from the group consisting of inorganic fine particles being silica fine particles, alumina fine particles, titania fine particles, strontium titanate fine particles or complex oxide fine particles thereof, and organic-inorganic composite fine particles containing the inorganic fine particles and organic fine particles.

Preferred among the foregoing are silica fine particles. The method for producing silica fine particles may be for instance a combustion method in which the particles are obtained through combustion of a silane compound (that is, a method for producing fumed silica), a detonation method in which a metallic silicon powder is caused to combust explosively, a wet-type method in which silica fine particles are obtained as a result of a neutralization reaction between sodium silicate and a mineral acid, and a sol-gel method (so-called Stoeber method) in which silica fine particles are obtained through hydrolysis of an alkoxysilane such as a hydrocarbyloxysilane.

Organic-inorganic composite fine particles preserve good durability and charging performance as an inorganic substance, and, thanks to the organic substance component of low heat capacity, are not prone to hinder fixation or coalescing of the toner particle during fixing. Both durability and fixing performance can be achieved readily as a result.

In view of the drawbacks of using an organic solvent or surfactant for dispersing the toner particle, preferably the method for dispersing the toner particle in a medium involves using an inorganic dispersant of polarity opposite to that of polar groups on the toner particle surface. Fixing of external additive particles is expected to be hindered at segments where the inorganic dispersant is adhered, and accordingly it is preferable to control the coverage ratio of the inorganic dispersant that covers the toner particle surface, in order to allow the external additive to stick more uniformly and firmly.

In the toner particle dispersion step, a coverage ratio A (area %) of the inorganic dispersant with respect to the surface of the toner particle dispersed in the toner particle dispersion is preferably from 20 area % to 70 area %, more preferably from 35 area % to 55 area %.

When the coverage ratio A is 20 area % or more, the toner particle is sufficiently dispersed in the solvent, and toner particle aggregation is less likely, which translates into improved uniformity of external additive fixing. When the coverage ratio A is 70 area % or less, the proportion of the inorganic dispersant on the surface of the toner particle is appropriate, and a large-size external additive can be fixed readily. The coverage ratio A of the inorganic dispersant relative to the toner particle surface can be controlled on the basis of the particle diameter and addition amount of the inorganic dispersant that is added.

The inventors found that by modifying the particle diameter of the external additive in accordance with the coverage ratio of the inorganic dispersant it becomes possible to sufficiently maintain fixing strength, also when using a large-size external additive. Specifically, the coverage ratio A (%) of the inorganic dispersant relative to the toner particle surface and the number-average particle diameter B (nm) of the primary particles of the external additive for wet-type external addition preferably satisfy formula (1) below. More preferably formula (1') below is satisfied.

$$A \times B \leq 7000 \quad (1)$$

$$5000 \leq A \times B \leq 6500 \quad (1')$$

This suggests that the larger the portion of the toner particle surface that is not coated with the inorganic dispersant, the larger is the particle diameter of the external additive that can be fixed. In view of the above results the inventors surmised that fixing the external additive at a portion of the toner particle surface not coated with the inorganic dispersant is effective in terms of allowing the external additive to be fixed firmly. In the case of external addition of a plurality of external additive particles, therefore, it is preferable to perform external addition starting from external additive particles of larger particle diameter, since in that case fixing strength is readily maintained evenly across the external additive particles that are utilized.

The external additive fixed to the toner particle surface can be caused to be embedded and fixed more firmly by, after wet-type external addition, raising the temperature of the toner particle dispersion having dispersed therein the inorganic dispersant and the toner particle, up to near the glass transition temperature Tg of the toner particle. Heating is preferably accomplished in an aqueous medium, for the purpose of retaining hydrophobic components such as a release agent within the toner particle.

Preferably the temperature of a toner particle dispersion that contains a toner particle is held for 15 minutes or longer, during or after the external addition step (the step of adding the external additive to the aqueous dispersion and fixing the external additive to the toner particle in the aqueous dispersion), at a temperature T1 of formula (2) below, where Tg denotes the glass transition temperature of the toner particle. The holding time ranges herein more preferably from 30 minutes to 120 minutes, more preferably from 50 minutes to 90 minutes.

When the temperature of the toner particle dispersion is Tg−10° C. or higher, softening of the toner particle surface progresses sufficiently, and the external additive becomes readily fixed thereonto. Similarly, when the temperature holding time is 15 minutes or longer, softening of the surface of the toner particle progresses sufficiently, and the external additive becomes readily fixed thereonto. Further, the progress of fixing of each toner particle is less likely to exhibit variability, and more uniform fixing of the external additive can be achieved.

When the temperature of the toner particle dispersion is Tg+25° C. or less, softening of the surface of the toner particle progresses suitably, and excessive burying of the external additive particles can be suppressed. More preferably, T1 satisfies formula (2') below.

$$\mathrm{Tg}-10°\ \mathrm{C.} \leq T1 \leq \mathrm{Tg}+25°\ \mathrm{C.} \quad (2)$$

$$\mathrm{Tg} \leq T1 \leq \mathrm{Tg}+25°\ \mathrm{C.} \quad (2')$$

Preferably, wet-type external addition is carried out using a stirring device that delivers high shear forces. Preferably, the stirring device is provided inside a vessel, such that the values of the liquid volume V ($m^3$) that is present in the vessel and of the used power P (kW) in the stirring device obey a certain relationship. As a result the same external addition strength can be achieved regardless of the scale of the apparatus. It is preferable that the volume V ($m^3$) of liquid present in the vessel of the stirring device and the used power P (kW) by the stirring device satisfy formula (3) below. Diligent research by the inventors indicates that yet higher fixing strength of the external additive and that allows withstanding long-term use, without excessive burying of the external additive can be achieved by satisfying formula (3). More preferably, P/V (kW/$m^3$) satisfies formula (3').

$$10 < P/V < 110 \quad (3)$$

$$15 < P/V < 105 \quad (3')$$

Here, the used power P is given by formula (4) below in which d (mm) denotes the blade diameter (major axis) of a stirring blade, and f (rpm) denotes the rotational speed of the blade in the stirring device.

$$P = 1.05 \times (f/60)^3 \times (d/1000)^5 \quad (4)$$

Colorant

The toner particle may contain a colorant. Examples of the colorant include various conventionally known dyes and pigments. Examples of black colorants include carbon black, magnetic materials and colorants that are color-matched to black using a below-described yellow colorant, a magenta colorant or a cyan colorant.

Examples of yellow colorants include monoazo compounds, disazo compounds, condensed azo compounds, isoindolinone compounds, anthraquinone compounds, azo metal complexes, methine compounds and allylamide compounds. Specific examples include C.I. Pigment Yellow 74, 93, 95, 109, 111, 128, 155, 174, 180 and 185.

Examples of magenta colorants include monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, perylene compounds and the like. Specific examples include C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254 and 269; and C.I. Pigment Violet 19 and the like.

Examples of cyan colorants include copper phthalocyanine compounds and derivatives thereof, anthraquinone compounds and basic dye lake compounds. Specific examples include C.I. Pigment Blue 1, 7, 15, 15:1, 15:2, 15:3, 15:4, 60, 62 and 66.

Wax

The toner particle may contain a wax. Conventionally known waxes can be used, without any particular limitation, as the wax. Specific examples include monofunctional ester waxes typified for instance by behenyl behenate and stearyl behenate; bifunctional ester waxes typified for instance by dibehenyl sebacate and hexanediol dibehenate; trifunctional ester waxes typified for instance by glycerin tribehenate; tetrafunctional ester waxes typified for instance by pentaerythritol tetrastearate and pentaerythritol tetrapalmitate; hexafunctional ester waxes typified for instance by dipentaerythritol hexastearate and dipentaerythritol hexapalmitate; polyfunctional ester waxes typified for instance by polyglycerin behenate; natural ester waxes typified for instance by carnauba wax and rice wax; amide waxes typified for instance by oleamide, erucamide and lauramide; Fischer-Tropsch hydrocarbon waxes and derivatives thereof; petroleum waxes such as paraffin wax, microcrystalline wax, petrolatum and derivatives thereof; polyolefin waxes such as polyethylene wax, polypropylene wax and derivatives thereof; higher fatty alcohols; and long-chain fatty acids.

Binder Resin

As the binder resin used in the toner particle a conventionally known resin can be used without any particular limitation. Specific examples thereof include vinyl resins; polyester resins; polyamide resins; furan resins; epoxy resins; xylene resins; silicone resins and the like. These binder resins may be used singly or in mixtures thereof. The binder resin contains preferably a vinyl resin, and is more preferably a vinyl resin.

Examples of vinyl resins that can be used include a homopolymers and copolymers of monomers such as styrenic monomers typified for instance by styrene, α-methylstyrene and divinylbenzene; unsaturated carboxylic acid esters typified for instance by methyl acrylate, butyl acrylate, methyl methacrylate, 2-hydroxyethyl methacrylate, t-butyl methacrylate and 2-ethylhexyl methacrylate; unsaturated carboxylic acids typified for instance by acrylic acid and methacrylic acid; unsaturated dicarboxylic acids typified for instance by maleic acid and the like; unsaturated dicarboxylic acid anhydrides typified for instance by maleic anhydride; nitrile-based vinyl monomers typified for instance by acrylonitrile; halogen-containing vinyl monomers typified for instance by vinyl chloride; nitro-based vinyl monomers typified for instance by nitrostyrene.

Polyester Resin

As the polyester resin there can be used the condensation polymers of the below-described acid component monomers and alcohol component monomers Examples of acid component monomers include the following. For instance terephthalic acid, isophthalic acid, phthalic acid, fumaric acid, maleic acid, malonic acid, succinic acid, glutaric acid, adipic acid, pimelic acid, suberic acid, azelaic acid, sebacic acid, camphoric acid, cyclohexanedicarboxylic acid and trimellitic acid.

Examples of alcohol component monomers include the following. For instance alkylene glycols such as ethylene glycol, diethylene glycol, triethylene glycol, 1,2-propanediol, 1,3-propanediol, 1,4-butanediol, neopentyl glycol and 1,4-bis(hydroxymethyl) cyclohexane; as well as polyalkylene glycols, bisphenol A, hydrogenated bisphenol, ethylene oxide adducts of bisphenol A, propylene oxide adducts of bisphenol A, glycerin, trimethylolpropane and pentaerythritol.

The toner particle may contain a polyester resin as a polar resin. The content of the polyester resin as a polar resin is preferably from 1 part by mass to 10 parts by mass with respect to 100 parts by mass of the binder resin.

Charge Control Agent

The toner particle may contain a charge control agent. Examples of charge control agents include the following. Organometallic compounds, chelate compounds, monoazo metal compounds, acetylacetone metal compounds, urea derivatives, metal-containing salicylic acid-based compounds, metal-containing naphthoic acid-based compounds, quaternary ammonium salts, calixarenes, silicon compounds, non-metal carboxylic acid-based compounds and derivatives thereof, as well as sulfonic acid resins having a sulfonic acid group, a sulfonic acid base, or a sulfonic acid ester group.

Specific examples of charge control agents for negative charging include the following. Metal compounds of aromatic carboxylic acids typified by salicylic acid, alkyl salicylic acids, dialkyl salicylic acids, naphthoic acid and dicarboxylic acids; polymers or copolymers having a sulfonic acid group, a sulfonic acid base or a sulfonic acid ester group; metal salts or metal complexes of azo dyes or azo pigments; as well as boron compounds, silicon compounds and calixarenes.

Examples of charge control agents for positive charging include the following. Quaternary ammonium salts, polymer-type compounds having such quaternary ammonium salts in side chains; guanidine compounds; nigrosine compounds; imidazole compounds and the like. A charge control agent for negative charging is often used among the foregoing.

Examples of the polymer or copolymer having a sulfonic acid group, a sulfonic acid base or a sulfonic acid ester group include homopolymers of sulfonic acid group-containing vinyl monomers typified by styrene sulfonic acid, 2-acrylamide-2-methylpropane sulfonic acid, 2-methacrylicamide-2-methylpropane sulfonic acid, vinylsulfonic acid and methacrylic sulfonic acid, and copolymers of the sulfonic acid group-containing vinyl monomer and other vinyl monomers.

The content of the charge control agent is preferably from 0.01 parts by mass to 20.0 parts by mass, more preferably from 0.1 parts by mass to 10.0 parts by mass relative to 100.0 parts by mass of the binder resin or a polymerizable monomer that generates the binder resin.

External Additive

The toner contains an external additive. The external additive is preferably at least one selected from the group consisting of inorganic fine particles such as silica fine particles, alumina fine particles, titania fine particles, strontium titanate fine particles or complex oxide fine particles of the foregoing, and organic-inorganic composite fine particles containing these inorganic fine particles and organic fine particles. The external additive may have been subjected to a hydrophobic treatment using a hydrophobic agent such as a silane coupling agent, a silicone oil or a mixture thereof.

The method for producing the toner particle is not particularly limited, and a known method can be resorted to. Examples include for instance suspension polymerization, dissolution suspension, emulsification aggregation and pulverization.

A suspension polymerization method will be explained in detail below as the method for producing the toner particle, but the production method is not limited thereto.

Step of Preparing a Polymerizable Monomer Composition

The step of preparing a polymerizable monomer composition is a step of producing a polymerizable monomer composition that contains a polymerizable monomer for generating a binder resin, and as needed additives such as a colorant and a wax.

The colorant may be mixed with another composition after having been dispersed beforehand in a polymerizable monomer or organic solvent, using for instance a medium stirring mill, or may be dispersed after all compositions have been mixed.

Step of Granulating Particles of the Polymerizable Monomer Composition

The step of granulating particles of the polymerizable monomer composition is a step of adding the polymerizable monomer composition to an aqueous medium, to produce a dispersion in which particles of the polymerizable monomer composition are dispersed in the aqueous medium.

A known surfactant, organic dispersant or inorganic dispersant may be used as a dispersion stabilizer that is utilized in the granulating step. Among the foregoing an inorganic dispersant can be suitably used, since the stability thereof does not readily deteriorate on account of the polymerization temperature or with the passage of time; moreover, the inorganic dispersant is easy to wash, and does not readily impact the toner. By selecting an inorganic dispersant as the dispersion stabilizer it becomes possible to use the aqueous medium containing the toner particle obtained after the polymerization step (toner particle dispersion), as it is, in the external addition step.

Examples of inorganic dispersants include the following. Polyvalent metal phosphates such as tricalcium phosphate, magnesium phosphate, aluminum phosphate and zinc phosphate; carbonates such as calcium carbonate and magnesium carbonate; inorganic salts such as calcium metasilicate, calcium sulfate and barium sulfate; calcium hydroxide, magnesium hydroxide and aluminum hydroxide; as well as inorganic oxides such as silica, bentonite, alumina and the like. The inorganic dispersant can be substantially be removed completely by being dissolved through addition of an acid or an alkali, once polymerization is over.

Polymerization Step

The polymerization step is a step of adding a polymerization initiator to the dispersion of the particles of the polymerizable monomer composition, and polymerizing the polymerizable monomer contained in the dispersion, to produce a dispersion in which a toner particle is dispersed in an aqueous medium. The polymerizable monomer can be polymerized in a short time, and the molecular weight of the binder resin can be controlled, through adjustment of the reaction temperature in the polymerization step.

The polymerization temperature is preferably 40° C. or higher, and is more preferably from 50° C. to 90° C. The polymerization temperature may be constant throughout, but may be raised in the latter half of the polymerization step, for the purpose of obtaining a desired molecular weight distribution. An ordinary temperature-adjustable stirring tank can be used in the polymerization step. Any stirring blade can be used herein as the stirring blade used for stirring, so long as a resin particle dispersion does not stagnate and the temperature within the tank is kept uniform.

Step of Removing a Volatile Component

A volatile component removal step may be carried out for the purpose of removing for instance unreacted polymerizable monomer from the toner particle dispersion obtained once the polymerization step is over. The volatile component removal step can be accomplished for instance through heating and stirring of the dispersion in a stirring tank equipped with a stirring means. The heating conditions in the volatile component removal step are adjusted as appropriate taking into consideration the vapor pressure of the components to be removed, such as the polymerizable monomer. The volatile component removal step can be carried out under normal pressure or reduced pressure.

Wet-Type External Addition Step

The wet-type external addition step has a toner particle dispersion step of obtaining a toner particle dispersion through dispersion of the toner particle and an inorganic dispersant in an aqueous medium. Preferably, a toner particle dispersion is obtained through addition of the toner particle to an aqueous medium after or simultaneously with (more preferably, after) addition of the inorganic dispersant to the aqueous medium.

The wet-type external addition step may be consecutively performed on the dispersion following the volatile component removal step, or may be of performed on a toner particle having undergone a drying step. In a case where wet-type external addition is to be performed on a toner particle after drying, the dry toner particle may be re-slurried in an aqueous medium.

When performing wet-type external addition on a dispersion as-is, obtained in the production of the toner particle, an inorganic dispersant may be selected as the dispersant in the granulating step. Doing so allows preparing a toner particle dispersion in which the toner particle and the inorganic dispersant become dispersed in the aqueous medium as a result of the polymerization step. Preferably, the external additive is added to the obtained toner particle dispersion, with stirring using a stirring device that delivers high shear forces.

In order to disperse the toner particle in the aqueous medium at the time of wet-type external addition to the toner particle having undergone the drying step, the toner particle is added after or simultaneously with (more preferably, after) addition of the inorganic dispersant to the aqueous medium, and the toner particle is dispersed. The external additive is added thereafter. External addition is accomplished subsequently through stirring using a stirring device that delivers high shear forces.

The coverage ratio of the toner particle by the inorganic dispersant can be controlled at that time on the basis of the particle diameter and addition amount of the inorganic dispersant that is added. Fixing strength can be controlled by properly adjusting the relationship between the particle diameter of the external additive that is utilized and the coverage ratio of the inorganic dispersant.

Solid-Liquid Separation Step, Washing Step and Drying Step

The dispersion may be treated using an acid or alkali for the purpose of removing inorganic dispersant particles adhered to the toner particle surface. After removal of the dispersant from the toner particle, the toner particle may be separated from the aqueous medium in accordance with a general solid-liquid separation method. Preferably, water is added once more, to wash the toner particle, for the purpose of completely removing the acid or alkali and the dispersant component dissolved in the acid or alkali. A toner particle can be obtained by repeating this washing step several times, and by performing solid-liquid separation again once sufficient washing has been carried out. The obtained toner particle may be dried using some known drying means.

The weight-average particle diameter of the obtained toner particle is preferably from 3 μm to 10 μm, and more preferably from 4 μm to 8 μm. The weight-average particle diameter of the toner particle can be controlled on the basis of the addition amount of the dispersant that is utilized in the granulating step.

Methods for calculating and measuring various physical property values are described next.

Method for Measuring the Number-Average Particle Diameter of Primary Particles of External Additive The number-average particle diameter of primary particles of the external additive is measured using a scanning electron microscope "S-4800" (by Hitachi High-Technologies Corporation). The external additive is observed, and the major axis of 100 primary particles of external additive is measured randomly, in a field of view maximally magnified to 50000 magnifications, to work out the number-average particle diameter. The observation magnifications can be adjusted as appropriate depending on the size of the external additive.

Method for Measuring the Weight-average Particle Diameter (D4)

The weight-average particle diameter (D4) of the toner particle is measured as follows.

As the measuring device there is utilized a precision particle size distribution measuring device "Coulter Counter Multisizer 3" (registered trademark, by Beckman Coulter, Inc.) relying on a pore electrical resistance method and equipped with a 100 μm aperture tube. The measurement conditions are set and measurement data is analyzed using dedicated software "Beckman Coulter Multisizer 3, Version 3.51" (by Beckman Coulter, Inc.) ancillary to the device. The measurements are performed in 25000 effective measurement channels.

An aqueous electrolyte solution used in the measurements can be prepared through dissolution of special-grade sodium chloride to a concentration of about 1 mass % in ion-exchanged water; for instance "ISOTON II" (by Beckman Coulter, Inc.) can be used herein as the aqueous electrolyte solution. The dedicated software is set up as follows, prior to measurement and analysis.

In the "Screen of Changing Standard Operating Mode (SOM)" of the dedicated software, a Total Count of the Control Mode is set to 50000 particles, a Number of Runs is set to one, and a Kd value is set to a value obtained using "Standard particles 10.0 μm" (by Beckman Coulter). The "Threshold/Noise Level" measurement button is pressed to thereby automatically set a threshold value and a noise level. Then the current is set to 1600 μA, the gain is set to 2, the electrolyte solution is set to ISOTON II, and "Flushing of the Aperture Tube Following Measurement" is ticked.

In the "Screen for Setting Conversion from Pulses to Particle diameter" of the dedicated software, the Bin Interval is set to a logarithmic particle diameter, the Particle Diameter Bin is set to 256 particle diameter bins, and the Particle Diameter Range is set to range from 2 μm to 60 μm.

A specific measurement method is as described below.

1. Herein 200 mL of aqueous electrolyte solution are placed in a 250 mL round-bottomed glass beaker ancillary to Multisizer 3, and the beaker is set on a sample stand and is stirred counterclockwise with a stirrer rod at 24 rotations per second. Dirt and air bubbles are then removed from the aperture tube by way of the "Flushing of the Aperture Tube" function of the dedicated software.

2. Then about 30 mL of the aqueous electrolyte solution are placed in a 100 mL flat-bottomed glass beaker. To the solution there is added, as a dispersant, 0.3 mL of a dilution of "Contaminon N" (10 mass % aqueous solution of a pH-7 neutral detergent for cleaning precision measuring instruments, made up of a nonionic surfactant, an anionic surfactant and an organic builder, by Wako Pure Chemical Industries, Ltd.), diluted thrice by mass in ion-exchanged water.

3. An ultrasonic disperser is prepared having an electrical output of 120 W "Ultrasonic Dispersion System Tetora 150" (by Nikkaki Bios Co., Ltd.), internally equipped with two oscillators that oscillate at a frequency of 50 kHz and are disposed at a phase offset by 180 degrees. Then 3.3 L of ion-exchanged water are charged into a water tank of the ultrasonic disperser, and 2 mL of Contaminon N are added to the water tank.

4. The beaker in 2. is set in a beaker-securing hole of the ultrasonic disperser, which is then operated. The height position of the beaker is adjusted so as to maximize a resonance state at the liquid level of the aqueous electrolyte solution in the beaker.

5. With the aqueous electrolyte solution in the beaker of 4. being ultrasonically irradiated, about 10 mg of the toner particle are then added little by little to the aqueous electrolyte solution, to be dispersed therein. The ultrasonic dispersion treatment is further continued for 60 seconds. The water temperature of the water tank during ultrasonic dispersion is adjusted as appropriate to lie in the range from 10° C. to 40° C.

6. The aqueous electrolyte solution in 5. containing the dispersed toner is added dropwise, using a pipette, to the round-bottomed beaker of 1. set inside the sample stand, and the measurement concentration is adjusted to about 5%. A measurement is then performed until the number of measured particles reaches 50000.

7. Measurement data is analyzed using the dedicated software ancillary to the apparatus, to calculate the weight-average particle diameter (D4). The "Average Diameter" in the "Analysis/Volume Statistics (arithmetic average)" screen, upon setting of Graph/% by Volume in the dedicated software, yields herein the weight-average particle diameter (D4).

Method for Measuring the Volume-Basis Median Diameter (D50) of the Inorganic Dispersant Test Sample Preparation Herein 9.0 g of a 1.0 mass % aqueous solution of sodium dodecylbenzene sulfonate are added to 1.0 g of an aqueous solution containing 1.0 mass % of the inorganic dispersant. Next the resulting mixed solution is dispersed for 5 minutes in an ultrasonic disperser "Ultrasonic Dispersion System Tetora 150" (by Nikkaki Bios Co., Ltd.), to yield a test sample (oscillation frequency 50 kHz, electrical output 120 W).

Particle Diameter Measurement

The above test sample is subjected to a particle size distribution measurement using Nanotrac Wave 2 UZ152 (by Microtrac Co., Ltd.) under the conditions below, and the value of D50 is taken as the particle diameter of the inorganic dispersant.

Measurement Conditions of Particle Size Distribution

Measurement time: 60 seconds
Number of measurements: 3 measurements
Transmissivity: transmissive
Particle refractive index: 1.62
Shape: non-spherical
Density: 3.17
Solvent refractive index: 1.333
Viscosity at high temperature: 30° C., 0.797 cP
Viscosity at low temperature: 20° C., 1.002 cP Method for Measuring the Glass Transition Temperature of the Toner Particle The glass transition temperature of the toner particle is measured according to ASTM D3418-82 using a differential scanning calorimeter "Q2000" (by TA Instruments Inc.).

The temperature at the detection unit of the instrument is corrected on the basis of melting points of indium and zinc, and the amount of heat is corrected on the basis of heat of fusion of indium.

Specifically, 2 mg of sample are weighed exactly, and are placed on a pan made of aluminum, and an empty aluminum-made pan is used as a reference. A measurement is then carried out within a measurement temperature range from −10° C. to 200° C., at a ramp rate of 10° C./min. In the measurement, the sample is heated once from −10° C. to 200° C. at a ramp rate of 10° C./min, and is next cooled from 200° C. to −10° C. at a ramp down rate of 10° C./min.

Thereafter, the sample is heated once more from −10° C. to 200° C. at a ramp rate of 10° C./min. A specific heat change is obtained within a temperature range from 30° C. to 100° C., in the course of this second heating. The intersection between a differential heat curve and a midpoint line of the baseline before and after the change in specific heat is taken herein as the glass transition temperature (Tg).

Method for Measuring the Coverage Ratio A of the Toner Particle Surface by the Inorganic Dispersant The coverage ratio A is measured for a toner particle dispersed in an aqueous medium, in the toner particle dispersion step. The toner particle dispersion is subjected to pressure filtration, and is sufficiently air-dried, to obtain a toner particle thereafter. Quantitative filter paper No. 5C by Advantech Co., Ltd. is used as filter paper. The obtained toner particle is measured in accordance with the procedure below.

The coverage ratio A is calculated through analysis, using the image analysis software Image-Pro Plus ver. 5.0 (by Nippon Roper KK), of a toner particle surface image captured using a Hitachi ultra-high resolution field-emission scanning electron microscope S-4800 (by Hitachi High-Technologies Corporation). The image capture conditions of S-4800 are as follows.

1. Sample Production

A conductive paste is thinly applied onto a sample stand (15 mm×6 mm aluminum sample stand), and toner particles are blown onto the paste. Air is further blown to remove excess toner particles from the sample stand, and thoroughly dry the toner particles. The sample stand is set in a sample holder, and the height of the sample stand is adjusted to 36 mm using a sample height gauge.

2. Setting of S-4800 Observation Conditions

Liquid nitrogen is poured into an anti-contamination trap attached to the housing of S-4800, until overflow, and the whole is allowed to stand for 30 minutes. Then "PC-SEM" of S-4800 is operated, to perform flushing (to purify a FE chip as an electron source). An acceleration voltage display portion of the control panel on the screen is clicked, and the "Flushing" button is pressed, to open a flushing execution dialog. Flushing is executed after the flushing strength is confirmed to be 2. It is then checked that an emission current by flushing is from 20 μA to 40 μA. The sample holder is inserted into a sample chamber of the S-4800 housing. Then "Origin" is pressed on the control panel, to transfer the sample holder to the observation position.

The acceleration voltage display portion is clicked to open an HV setting dialog, and acceleration voltage is set to "0.8 kV" and emission current to "20 μA". In a "Basic" tab of the operation panel, signal selection is set to "SE", "Upper (U)" and "+BSE" are selected as an SE detector, and "L.A. 100" is selected using the selection button to the right of "+BSE", to set a mode of observation on a backscattered electron image. In the same "Basic" tab of the operation panel, a probe current of a condition block of an electro-optical system is set to "Normal", focus mode to "UHR", and WD to "3.0 mm". The "On" button of the acceleration voltage display portion on the control panel is pressed, to apply acceleration voltage.

3. Calculation of the Number-Average Particle Diameter (D1) of Toner

The magnification indicator in the control panel is dragged to set magnifications to 5000 (5k) magnifications. The "COARSE" focus knob on the operation panel is turned, and the aperture alignment is adjusted once a certain focus is achieved throughout the field of view. Then "Align" is clicked on the control panel, to display an alignment dialog, and "Beam" is selected. The STIGMA/ALIGNMENT knobs (X, Y) on the operation panel are turned, and the displayed beam is moved to the center of the concentric circle. Then "Aperture" is selected, and the STIGMA/ALIGNMENT knobs (X, Y) are turned one at a time, until image movement ceases or is minimal. The aperture dialog is closed, and focusing is performed using autofocus.

This operation is then repeated twice to adjust focus Thereafter the particle diameter of 300 toner particles is measured, to work out the number-average particle diameter (D1). The particle diameter of each particle is the largest diameter at the time of observation of that toner particle.

4. Focus Adjustment

In a state where the midpoint of maximum diameter is aligned with the center of the measurement screen, for particles having a number-average particle diameter (D1) ±0.1 μm, obtained in 3., the magnification indicator in the control panel is dragged to set magnifications to 10000 (10k) magnifications.

The "COARSE" focus knob on the operation panel is turned, and the aperture alignment is adjusted once a certain focus is achieved throughout the field of view. Then "Align" is clicked on the control panel, to display an alignment dialog, and "Beam" is selected. The STIGMA/ALIGNMENT knobs (X, Y) on the operation panel are turned, and the displayed beam is moved to the center of the concentric circle. Then "Aperture" is selected, and the STIGMA/ALIGNMENT knobs (X, Y) are turned one at a time, until image movement ceases or is minimal. The aperture dialog is closed, and focusing is performed using autofocus.

Thereafter, magnifications are set to 5000 (5k) magnifications, focus is adjusted using the focus knob and STIGMA/ALIGNMENT knobs as described above, and focusing is performed once more using autofocus. This operation is repeated again to adjust focus. Herein the measurement precision of coverage ratio is prone to decrease when the inclination angle of an observation surface is large. To perform the analysis, therefore, an observation surface exhibiting as little inclination as possible is selected by choosing the observation surface so that the entirety thereof is focused simultaneously.

5. Image Storage

Brightness is adjusted in an ABC mode, and 640×480 pixel micrographs are captured and stored. The analysis described below is performed using the resulting image files. One micrograph is captured for each toner particle, to obtain images of at least 30 particles.

6. Image Analysis

The image obtained in accordance with the above method is binarized using the below-described analysis software, to thereby calculate the coverage ratio A. The above screen is divided into 12 squares, each of which is analyzed. The analysis procedure by the image analysis software Image-Pro Plus ver. 5.0 is as follows.

Herein a SEM image is acquired using the above image analysis software, and is subjected to filtering by 3×3 pixels. Subsequently, the surface area A of one toner particle is worked out from the contour of the toner particle. A binarization process is performed then within the contour of the toner particle. A threshold value calculated by automatic processing is used in this case as the threshold value for binarization. For instance the inorganic dispersant is identified as black.

A surface area B identified as black is obtained next. The coverage ratio A is then calculated in accordance with the expression below.

$$\text{Coverage ratio } A\text{(area \%) of inorganic dispersant} = \text{surface area } B/\text{surface area } A \times 100$$

Method for Measuring the Fixing Ratio of the External Additive

An explanation follows next on a measurement of the fixing ratio of the external additive. The measured element may be Si in a case where the external additive is silica fine particles. The measured element by X-ray fluorescence analysis may be selected in accordance with the external additive that is utilized, in a case where the external additive is other than silica.

Herein 20 g of "Contaminon N" (10 mass % aqueous solution of a pH-7 neutral detergent for cleaning precision measuring instruments, made up of a nonionic surfactant, an anionic surfactant and an organic builder) is weighed in a 50 mL vial, and is mixed with 1 g of toner. The vial is set in "KM Shaker" (model: V. SX) by Iwaki Industry Co., Ltd., and shaken for 30 seconds at a speed set to 50. As a result, the external additive migrates from the toner particle surface towards the dispersion, depending on the fixing state of the external additive.

In the case of non-magnetic toner, the toner particle and the external additive having migrated to the supernatant are thereafter separated using a centrifuge (H-9R; by Kokusan Co., Ltd.) (at 1000 rpm for 5 minutes). In the case of magnetic toner, the external additive having migrated to the supernatant is separated, with the toner particle restrained using a neodymium magnet, and the precipitated toner particle is vacuum-dried (40° C./1 day), to yield a sample.

The toner is pelletized by press molding, described below, to prepare a sample. Elements specific to the external additive to be analyzed in the toner samples before and after the above treatment are quantified by wavelength-dispersive X-ray fluorescence analysis (XRF) illustrated below. The amount of external additive remaining on the toner particle surface without migrating to the supernatant as a result of the above treatment is worked out on the basis of the expression below, to yield a fixing ratio. The arithmetic mean value of 100 samples is taken herein.

i. Example of the Device Used

X-ray fluorescence analyzer 3080 (by Rigaku Corporation)

ii. Sample Preparation

A sample press molding machine by Maekawa Testing Machine Mfg. Co., Ltd. is used for sample preparation. An aluminum ring (model number: 3481E1) is packed with 0.5 g of toner, and the toner is pelletized through pressing for 1 min under a load set to 5.0 tons.

iii. Measurement Conditions

Measurement diameter: 10φ

Measurement potential, voltage 50 kV, 50 mA to 70 mA

2θ angle 25.12°

Crystal plate LiF

Measurement time 60 seconds iv. Method for Calculating the Fixing Ratio of the External Additive Fixing ratio (%) of external additive=(element intensity derived from external additive in toner after treatment/element intensity derived from external additive in toner before treatment)×100 [formula]

The expression is as follows in a case where the external additive is silica.

Fixing ratio (%) of silica fine particles=(toner Si intensity after treatment/toner Si intensity after treatment)×100 [formula]

EXAMPLES

The present invention will be explained next in further detail on the basis of examples and comparative examples, but the present invention is not limited in any way to these examples. Unless otherwise stated, parts and percentages in the examples are all mass-based.

Example 1

Production Example of Toner 1

Step of Preparing a Colorant-Dispersed Solution

| | |
|---|---|
| Styrene | 78 parts |
| n-butyl acrylate | 22 parts |
| Copper phthalocyanine pigment ("ECB308") (by Dainichiseika Color & Chemicals Mfg. Co., Ltd.)) | 6 parts |
| Negative charge control agent (aluminum compound of dialkylsalicylic acid) | 1 part |

A colorant-dispersed solution was prepared by dispersing the above components in a medium stirring mill, using zirconia beads.

Step of Preparing a Polymerizable Monomer Composition

| | |
|---|---|
| Colorant-dispersed solution | 107 parts |
| Polystyrene (Mw = 3100, Mw/Mn = 1.22, Tg = 54° C.) | 25 parts |
| Saturated polyester resin (polycondensate of propylene oxide-modified bisphenol A and isophthalic acid; Mn = 11000, Mw/Mn = 2.4, acid value = 30 mgKOH/g, Tg = 72° C.) | 4 parts |
| Negative charge control agent (aluminum compound of dialkylsalicylic acid) | 1 part |
| Polyethylene wax (maximum endothermic peak at 65° C. in DSC, half width of endothermic peak of 17° C.) | 10 parts |

The above components were charged into a temperature-adjustable stirring tank, the temperature was raised to 63° C. while under stirring, and stirring was continued for further 45 minutes, to obtain a polymerizable monomer composition.

Step of Preparing an Aqueous Medium

| | |
|---|---|
| Water | 97.8 parts |
| $Na_3PO_4$ | 1.2 parts |
| 10% aqueous solution of hydrochloric acid | 0.3 parts |

The above components were charged into a separate temperature-adjustable stirring tank, with stirring until complete dissolution of $Na_3PO_4$ while the temperature was raised up to 60° C.

To the resulting solution there was added a solution obtained by dissolving 0.7 parts of $CaCl_2$ in 5 parts of water, and the whole was stirred for 30 minutes while the temperature was kept at 60° C., at a rotational speed of 50 (1/s), using "CLEARMIX" (by M Technique Co., Ltd.), to thereby obtain an aqueous medium being a water suspension of fine particles of $Ca_3(PO_4)_2$.

Granulating Step

While under stirring of the obtained aqueous medium at 60° C. at a rotational speed of 50 (1/s) using "CLEARMIX" (by M Technique Co., Ltd.), the above-described polymerizable monomer composition was added thereto, with continued stirring for 3 minutes. Thereafter, 7.0 parts of t-butyl peroxypivalate as a polymerization initiator were added to 100 parts of the polymerizable monomer, and the resulting mixture was further stirred for 7 minutes, to obtain a dispersion of a polymerizable monomer composition.

Polymerization Step

The polymerizable monomer composition dispersion obtained in the above steps was introduced into a temperature-adjustable stirring tank, the liquid temperature was raised to 67° C., polymerization was carried out for 5 hours while under stirring, and then the temperature was further raised to 80° C. and polymerization was continued for 4 hours, to yield a polymer fine particle dispersion.

Volatile Component Removal Step and Cooling Step

The polymer fine particle dispersion obtained in the polymerization step was introduced into a steam-heatable stirring tank, and the liquid temperature was raised to 100° C. through blowing of steam via a steam inlet, with stirring for 5 hours, to thereby perform a volatile component removal step.

Solid-Liquid Separation Step, Washing Step and Drying Step

Hydrochloric acid was then added to the polymer fine particle dispersion, with stirring, to dissolve fine particles of $Ca_3(PO_4)_2$ with which the polymer fine particles were covered. To perform solid-liquid separation, the solution was dewatered using a pressure filter, and water was added, for re-dispersion, followed once more by dewatering using a pressure filter. Washing was thus accomplished by repeating this operation until sufficient removal of $Ca_3(PO_4)_2$. After washing, the polymer fine particles obtained in the final solid-liquid separation were sufficiently dried using a known drying means, to yield Toner particle 1.

A measurement of the granularity of the obtained Toner particle 1 yielded a weight-average particle diameter (D4) of 5.8 μm and a sharpness (D4/D1) of 1.15 of the particle size distribution. The glass transition temperature Tg of Toner particle 1 was 58° C.

Wet-Type External Addition Step

Step of Preparing an Aqueous Medium for Wet-Type External Addition

| | |
|---|---|
| Water | 97.8 parts |
| $Na_3PO_4$ | 0.8 parts |
| 10% aqueous solution of hydrochloric acid | 0.2 parts |

The above components were charged into a temperature-adjustable stirring tank, with stirring until complete dissolution of $Na_3PO_4$ while the temperature was raised up to 60° C.

To the resulting solution there was added a solution obtained by dissolving 0.47 parts of $CaCl_2$) in 3.3 parts of water, and the whole was stirred for 30 minutes while the temperature was kept at 60° C., at a rotational speed of 50 (1/s), using "CLEARMIX" (by M Technique Co., Ltd.), to thereby obtain an aqueous medium being a water suspension of fine particles of $Ca_3(PO_4)_2$.

Wet-Type External Addition Step

Then 150 parts of Toner particle 1 obtained through drying were added to the prepared aqueous medium for wet-type external addition, in a temperature-adjustable stirring tank, with stirring for 30 minutes while maintaining the temperature at 40° C., at a rotational speed of 50 (1/s), using "CLEARMIX" (by M Technique Co., Ltd.), to uniformly disperse the toner particle.

Next, 6.8 parts of hydrophobic silica fine particles (number-average particle diameter of primary particles: 200 nm) were added, with stirring for 30 minutes while maintaining the temperature at 40° C., at a rotational speed of 70 (1/s), using "CLEARMIX" (by M Technique Co., Ltd.), to thereby cause the hydrophobic silica fine particles to be fixed to the toner particle surface. Then the temperature of the stirring tank was raised to 80° C., at a rotational speed of 30 (1/s) of the "CLEARMIX" (by M Technique Co., Ltd.), followed by holding for 60 minutes, to obtain a toner dispersion.

Solid-Liquid Separation Step, Washing Step and Drying Step of the Toner Dispersion Hydrochloric acid was added to the toner dispersion, with stirring, to dissolve fine particles of $Ca_3(PO_4)_2$ on the toner surface. To perform solid-liquid separation, the solution was dewatered using a pressure filter, and water was added, for re-dispersion, followed once more by dewatering using a pressure filter. Washing was thus accomplished by repeating this operation until sufficient removal of $Ca_3(PO_4)_2$. After washing, the toner obtained in the final solid-liquid separation was sufficiently dried using a known drying means, to yield Toner 1.

Production Example of Toners 2 to 9 and 11 to 20

Toner particles 2 to 9 and 11 to 20 were obtained by performing an operation similar to that of the production of Toner 1, but herein the type and particle diameter of the inorganic dispersant, the type and particle diameter of the external additive, the coverage ratio of the inorganic dispersant, and P/V in the stirring device at the time of the temperature holding step after wet-type external addition, and at the time of wet-type external addition, were modified to the contents set out in Table 1-1 and Table 1-2.

Production Example of Toner 10

Step of Preparing a Polymerizable Monomer Composition

| | |
|---|---|
| Behenyl acrylate | 66.8 parts |
| Methacrylonitrile | 21.9 parts |
| Styrene | 11.0 parts |
| Poly(methyl methacrylate) having a methacryloyl group at the end (macromonomer, by Toagosei Co., Ltd., AA-6, Mn: 6000) | 0.3 parts |
| Pigment Blue 15:3 | 6.5 parts |
| Charge control resin (quaternary ammonium salt-containing styrene-acrylic acid resin, "FCA-201-PS" by Fujikura Kasei Co., Ltd.) | 0.7 parts |
| Water (Product name: HNP-51, melting point 78° C., by Nippon Seiro Co., Ltd.) | 20.0 parts |
| Toluene | 100.0 parts |

A mixture made up of the above materials was prepared. The obtained mixture was charged into an attritor (by Nippon Coke & Engineering Co., Ltd.), and was dispersed for 2 hours at 200 rpm using zirconia beads having a diameter of 5 mm, to yield a polymerizable monomer composition.

Step of Preparing an Aqueous Medium

At room temperature, an aqueous solution resulting from dissolving 6.2 parts of sodium hydroxide (alkali metal hydroxide) in 50 parts of ion-exchanged water was added gradually, while under stirring, to an aqueous solution resulting from dissolving 10.2 parts of magnesium chloride (water-soluble polyvalent metal salt) in 250 parts of ion-exchanged water, to prepare a dispersion of a magnesium hydroxide colloid (poorly water-soluble metal hydroxide colloid).

Granulating Step

The above polymerizable monomer composition was added, at room temperature to the above magnesium hydroxide colloid dispersion, with stirring. Then 8.0 parts of t-butyl peroxypivalate (Perbutyl PV, by NOF Corporation) were added, as a polymerization initiator, followed by dispersion while under stirring at a rotational speed of 50 (1/s), using "CLEARMIX" (by M Technique Co., Ltd.), to elicit formation of droplets of the polymerizable monomer composition.

Polymerization Step

The polymerizable monomer composition dispersion obtained in the above steps was introduced into a temperature-adjustable stirring tank, the liquid temperature was raised to 67° C., polymerization was carried out for 5 hours while under stirring, and then the temperature was further raised to 80° C. and polymerization was continued for 4 hours, to yield a polymer fine particle dispersion.

Volatile Component Removal Step and Cooling Step

The polymer fine particle dispersion obtained in the polymerization step was introduced into a steam-heatable stirring tank, and the liquid temperature was raised to 100° C. through blowing of steam via a steam inlet, with stirring for 5 hours, to thereby perform a volatile component removal step.

Solid-Liquid Separation Step, Washing Step and Drying Step

Sulfuric acid was added dropwise at room temperature, while under stirring of the polymer fine particle dispersion obtained above; this acid washing was performed until pH dropped to 6.5 or below. Filtration separation was performed then, with re-slurrying through addition of 500 parts of ion-exchanged water to the obtained solid fraction; this water washing treatment (washing, filtration and dewatering) was then repeated several times. After washing, the toner obtained in the final solid-liquid separation was sufficiently dried using a known drying means, to yield Toner particle 10.

A measurement of the granularity of the obtained Toner particle 10 yielded a weight-average particle diameter (D4) of 5.6 μm and a sharpness (D4/D1) of 1.14 of the particle size distribution. The glass transition temperature Tg of Toner particle 10 was 58° C.

Wet-Type External Addition Step

Step of Preparing an Aqueous Medium for Wet-Type External Addition

An aqueous solution was prepared through dissolution of 9.8 parts of magnesium chloride (water-soluble polyvalent metal salt) in 250 parts of ion-exchanged water in a temperature-adjustable stirring tank. To this aqueous solution there was gradually added, while under stirring, an aqueous solution in turn obtained by dissolving 6.9 parts of sodium hydroxide (alkali metal hydroxide) in 50 parts of ion-exchanged water, to prepare a dispersion (aqueous medium for wet-type external addition 2) of a magnesium hydroxide colloid (poorly water-soluble metal hydroxide colloid).

Then 50 parts of Toner particle 10 obtained through drying were added to the prepared Aqueous medium for wet-type external addition 2 in a temperature-adjustable stirring tank, with stirring for 30 minutes while maintaining the temperature at 40° C., at a rotational speed of 50 (1/s), using "CLEARMIX" (by M Technique Co., Ltd.), to uniformly disperse the toner particle.

Next, 6.8 parts of hydrophobic silica fine particles (number-average particle diameter of primary particles: 200 nm) were added, with stirring for 30 minutes while maintaining the temperature at 40° C., at a rotational speed of 90 (1/s), using "CLEARMIX" (by M Technique Co., Ltd.), to thereby fix the hydrophobic silica fine particles. Then the temperature was raised to 80° C., at a rotational speed of 30 (1/s) of the "CLEARMIX" (by M Technique Co., Ltd.), followed by holding for 30 minutes, to obtain a toner dispersion.

Solid-Liquid Separation Step, Washing Step and Drying Step of the Toner Dispersion Sulfuric acid was added dropwise, at room temperature, to the toner dispersion; this acid washing was performed until pH dropped to 6.5 or below. Filtration separation was performed then, with re-slurrying through addition of 500 parts of ion-exchanged water to the obtained solid fraction; this water washing treatment (washing, filtration and dewatering) was then repeated several times. After washing, the toner obtained in the final solid-liquid separation was sufficiently dried using a known drying means, to yield Toner 10.

Production Example of Toner 21

Toner particle 21 was obtained by performing an operation similar to that of the production of Toner 1, but herein the type and particle diameter of the inorganic dispersant, the type and particle diameter of the external additive, the coverage ratio of the inorganic dispersant, and P/V in the stirring device at the time of the temperature holding step after wet-type external addition, and at the time of wet-type external addition, were modified to the contents set out in Table 1-1 and Table 1-2.

In order to control the particle diameter of the dispersant, the following changes were made to Toner 1 in the step of preparing an aqueous medium for wet-type external addition.

Step of Preparing an Aqueous Medium for Wet-Type External Addition

| | |
|---|---|
| Water | 97.8 parts |
| $Na_3PO_4$ | 0.8 parts |
| 10% aqueous solution of hydrochloric acid | 0.2 parts |

The above components were charged into a temperature-adjustable stirring tank, with stirring until complete dissolution of $Na_3PO_4$ while the temperature was raised up to 60° C.

To the resulting solution there was added a solution obtained by dissolving 0.47 parts of $CaCl_2$ in 3.3 parts of water, and the whole was stirred for 30 minutes while the temperature was kept at 60° C., at a rotational speed of 80 (1/s), using "CLEARMIX" (by M Technique Co., Ltd.), to thereby obtain an aqueous medium being a water suspension of fine particles of $Ca_3(PO_4)_2$.

Production Example of Toner 22

Toner particle 22 was obtained by performing an operation similar to that of the production of Toner 1, but herein the type and particle diameter of the inorganic dispersant, the type and particle diameter of the external additive, the coverage ratio of the inorganic dispersant, and P/V in the stirring device at the time of the temperature holding step after wet-type external addition, and at the time of wet-type external addition, were modified to the contents set out in Table 1-1 and Table 1-2.

In order to control the particle diameter of the dispersant, the following changes were made to Toner 1 in the step of preparing an aqueous medium for wet-type external addition.

Step of Preparing an Aqueous Medium for Wet-Type External Addition

| | |
|---|---|
| Water | 97.8 parts |
| $Na_3PO_4$ | 0.8 parts |
| 10% aqueous solution of hydrochloric acid | 0.2 parts |

The above components were charged into a temperature-adjustable stirring tank, with stirring until complete dissolution of $Na_3PO_4$ while the temperature was raised up to 60° C.

To the resulting solution there was added a solution obtained by dissolving 0.47 parts of $CaCl_2$) in 3.3 parts of water, and the whole was stirred for 30 minutes while the temperature was kept at 60° C., at a rotational speed of 10 (1/s), using "CLEARMIX" (by M Technique Co., Ltd.), to thereby obtain an aqueous medium being a water suspension of fine particles of $Ca_3(PO_4)_2$.

Production Example of Toner 23

Toner particle 23 was obtained by performing an operation similar to that of the production of Toner 1, but herein the type and particle diameter of the inorganic dispersant, the type and particle diameter of the external additive, the coverage ratio of the inorganic dispersant, and P/V in the stirring device at the time of the temperature holding step after wet-type external addition, and at the time of wet-type external addition, were modified to the contents set out in Table 1-1 and Table 1-2.

In order to control the particle diameter of the dispersant, the following changes were made to Toner 1 in the step of preparing an aqueous medium for wet-type external addition.

Step of Preparing an Aqueous Medium for Wet-Type External Addition

| | |
|---|---|
| Water | 97.8 parts |
| $Na_3PO_4$ | 0.8 parts |
| 10% aqueous solution of hydrochloric acid | 0.2 parts |

The above components were charged into a temperature-adjustable stirring tank, with stirring until complete dissolution of $Na_3PO_4$ while the temperature was raised up to 50° C.

To the resulting solution there was added a solution obtained by dissolving 0.47 parts of $CaCl_2$ in 3.3 parts of water, and the whole was stirred for 30 minutes while the temperature was kept at 50° C., at a rotational speed of 80 (1/s), using "CLEARMIX" (by M Technique Co., Ltd.), to thereby obtain an aqueous medium being a water suspension of fine particles of $Ca_3(PO_4)_2$.

Production Example of Toner 24

Toner particle 24 was obtained by performing an operation similar to that of the production of Toner 1, but herein the type and particle diameter of the inorganic dispersant, the type and particle diameter of the external additive, the coverage ratio of the inorganic dispersant, and P/V in the stirring device at the time of the temperature holding step after wet-type external addition, and at the time of wet-type external addition, were modified to the contents set out in Table 1-1 and Table 1-2.

In order to control the particle diameter of the dispersant, the following changes were made to Toner 1 in the step of preparing an aqueous medium for wet-type external addition.

Step of Preparing an Aqueous Medium for Wet-Type External Addition

| | |
|---|---|
| Water | 97.8 parts |
| $Na_3PO_4$ | 0.8 parts |
| 10% aqueous solution of hydrochloric acid | 0.2 parts |

The above components were charged into a temperature-adjustable stirring tank, with stirring until complete dissolution of $Na_3PO_4$ while the temperature was raised up to 80° C.

To the resulting solution there was added a solution obtained by dissolving 0.47 parts of $CaCl_2$ in 3.3 parts of water, and the whole was stirred for 30 minutes while the temperature was kept at 80° C., at a rotational speed of 10 (1/s), using "CLEARMIX" (by M Technique Co., Ltd.), to thereby obtain an aqueous medium being a water suspension of fine particles of $Ca_3(PO_4)_2$.

Production Example of Toner 25

Toner 25 was obtained by performing an operation similar to that of the production of Toner 1, but herein only water was used as the aqueous medium for wet-type external addition, and no washing with hydrochloric acid was carried out in the washing step after wet-type external addition.

Production Example of Toner 26

Toner 26 was obtained by performing an operation similar to that of the production of Toner 1, but herein a mixed solution of methanol:water=1:3 (mass ratio) was used as the aqueous medium for wet-type external addition, and no washing with hydrochloric acid was carried out in the washing step after wet-type external addition.

Production Example of Toner 27

Toner 27 was obtained by performing an operation similar to that of the production of Toner 1, but herein an aqueous medium resulting from adding 0.15 parts of sodium dodecylbenzene sulfonate to 300 parts of ion-exchanged water was used as the aqueous medium for wet-type external addition, and no washing with hydrochloric acid was carried out in the washing step after wet-type external addition.

Production Example of Toner 28

Toner 28 was obtained by performing an operation similar to that of the production of Toner 1, but herein external additive fine particles were added to the aqueous medium for wet-type external addition prior to addition of the dried toner to the aqueous medium for wet-type external addition in the wet-type external addition step.

Production Example of Toner 29

Toner 29 was obtained by performing an operation similar to that of the production of Toner 1, but herein also external additive fine particles were added to the aqueous medium for wet-type external addition simultaneously with addition of the dried toner to the aqueous medium for wet-type external addition in the wet-type external addition step.

Production Example of Toner 30

Herein Toner 30 was obtained by, instead of performing the wet-type external addition step in the production of Toner 1, performing external addition through addition of 1.0 part of hydrophobic silica to a toner particle (100 parts) obtained as a result of the solid-liquid separation step, washing step and drying step of a toner dispersion, using a Henschel mixer (by Nippon Coke Industry Co., Ltd. (formerly Mitsui Miike Machinery Co., Ltd.)).

TABLE 1-1

| Example No. | Toner No. | Dispersant | External additive charging step | Inorganic dispersant particle diameter | External additive perticle diameter B | Inorganic dispersant coverage ratio A |
|---|---|---|---|---|---|---|
| 1 | 1 | Inorganic dispersant particles | After dispersion | 100 | 200 | 30 |
| 2 | 2 | Inorganic dispersant particles | After dispersion | 100 | 200 | 30 |
| 3 | 3 | Inorganic dispersant particles | After dispersion | 100 | 200 | 30 |
| 4 | 4 | Inorganic dispersant particles | After dispersion | 100 | 200 | 30 |
| 5 | 5 | Inorganic dispersant particles | After dispersion | 100 | 200 | 30 |
| 6 | 6 | Inorganic dispersant particles | After dispersion | 100 | 200 | 30 |
| 7 | 7 | Inorganic dispersant particles | After dispersion | 100 | 200 | 30 |
| 8 | 8 | Inorganic dispersant particles | After dispersion | 100 | 200 | 30 |
| 9 | 9 | Inorganic dispersant particles | After dispersion | 100 | 200 | 30 |
| 10 | 10 | Inorganic dispersant particles | After dispersion | 100 | 200 | 25 |
| 11 | 11 | Inorganic dispersant particles | After dispersion | 100 | 175 | 40 |
| 12 | 12 | Inorganic dispersant particles | After dispersion | 100 | 200 | 40 |
| 13 | 13 | Inorganic dispersant particles | After dispersion | 100 | 175 | 50 |
| 14 | 14 | Inorganic dispersant particles | After dispersion | 100 | 300 | 20 |
| 15 | 15 | Inorganic dispersant particles | After dispersion | 100 | 200 | 70 |
| 16 | 16 | Inorganic dispersant particles | After dispersion | 100 | 300 | 15 |
| 17 | 17 | Inorganic dispersant particles | After dispersion | 100 | 100 | 75 |
| 18 | 18 | Inorganic dispersant particles | After dispersion | 100 | 300 | 75 |
| 19 | 19 | Inorganic dispersant particles | After dispersion | 100 | 80 | 75 |
| 20 | 20 | Inorganic dispersant particles | After dispersion | 100 | 320 | 75 |
| 21 | 21 | Inorganic dispersant particles | After dispersion | 30 | 320 | 75 |
| 22 | 22 | Inorganic dispersant particles | After dispersion | 200 | 320 | 75 |
| 23 | 23 | Inorganic dispersant particles | After dispersion | 25 | 320 | 75 |
| 24 | 24 | Inorganic dispersant particles | After dispersion | 210 | 320 | 75 |
| Comparative 1 | 25 | Water only | — | — | 200 | — |
| Comparative 2 | 26 | Alcohol dispersion | — | — | 200 | — |
| Comparative 3 | 27 | Surfactant | — | — | 200 | — |
| Comparative 4 | 28 | Inorganic dispersant particles | Before dispersion | 100 | 200 | 30 |
| Comparative 5 | 29 | Inorganic dispersant particles | Simultaneous with dispersion | 100 | 200 | 30 |
| Comparative 6 | 30 | — | — | — | 200 | — |

TABLE 1-2

| Example No. | Toner No. | A × B | Inorganic dispersant type | External additive type | Temperature holding time | Heat-up temperature | P/V |
|---|---|---|---|---|---|---|---|
| 1 | 1 | 6000 | Calcium phosphate | Silica fine particles | 60 min | 80° C. | 50 |
| 2 | 2 | 6000 | Calcium phosphate | Silica fine particles | 60 min | 80° C. | 15 |
| 3 | 3 | 6000 | Calcium phosphate | Silica fine particles | 60 min | 80° C. | 100 |
| 4 | 4 | 6000 | Calcium phosphate | Silica fine particles | 60 min | 80° C. | 10 |
| 5 | 5 | 6000 | Calcium phosphate | Silica fine particles | 60 min | 80° C. | 105 |
| 6 | 6 | 6000 | Calcium phosphate | Silica fine particles | 60 min | 50° C. | 105 |
| 7 | 7 | 6000 | Calcium phosphate | Silica fine particles | 60 min | 90° C. | 105 |
| 8 | 8 | 6000 | Calcium phosphate | Silica fine particles | 30 min | 80° C. | 105 |
| 9 | 9 | 6000 | Calcium phosphate | Strontium titanate | 30 min | 80° C. | 105 |
| 10 | 10 | 5000 | Magnesium hydroxide | Silica fine particles | 30 min | 80° C. | 105 |
| 11 | 11 | 7000 | Calcium phosphate | Silica fine particles | 30 min | 90° C. | 105 |
| 12 | 12 | 8000 | Calcium phosphate | Silica fine particles | 30 min | 90° C. | 105 |
| 13 | 13 | 8750 | Calcium phosphate | Silica fine particles | 30 min | 90° C. | 105 |
| 14 | 14 | 6000 | Calcium phosphate | Silica fine particles | 30 min | 90° C. | 105 |
| 15 | 15 | 14000 | Calcium phosphate | Silica fine particles | 30 min | 90° C. | 105 |
| 16 | 16 | 4500 | Calcium phosphate | Silica fine particles | 30 min | 90° C. | 105 |
| 17 | 17 | 7500 | Calcium phosphate | Silica fine particles | 30 min | 90° C. | 105 |
| 18 | 18 | 22500 | Calcium phosphate | Silica fine particles | 30 min | 90° C. | 105 |
| 19 | 19 | 6000 | Calcium phosphate | Silica fine particles | 30 min | 90° C. | 105 |
| 20 | 20 | 24000 | Calcium phosphate | Silica fine particles | 30 min | 90° C. | 105 |
| 21 | 21 | 24000 | Calcium phosphate | Silica fine particles | 30 min | 90° C. | 105 |
| 22 | 22 | 24000 | Calcium phosphate | Silica fine particles | 30 min | 90° C. | 105 |
| 23 | 23 | 24000 | Calcium phosphate | Silica fine particles | 30 min | 90° C. | 105 |
| 24 | 24 | 24000 | Calcium phosphate | Silica fine particles | 30 min | 90° C. | 105 |
| Comparative 1 | 25 | — | — | Silica fine particles | 60 min | 80° C. | 50 |
| Comparative 2 | 26 | — | — | Silica fine particles | 60 min | 80° C. | 50 |
| Comparative 3 | 27 | — | — | Silica fine particles | 60 min | 80° C. | 50 |
| Comparative 4 | 28 | 6000 | Calcium phosphate | Silica fine particles | 60 min | 80° C. | 50 |
| Comparative 5 | 29 | 6000 | Calcium phosphate | Silica fine particles | 60 min | 80° C. | 50 |
| Comparative 6 | 30 | — | — | Silica fine particles | — | — | — |

The particle diameter of the inorganic dispersant in the table is a volume-basis median diameter (D50) (nm). The external additive particle diameter B is the number-average particle diameter (nm) of primary particles. The units of the coverage ratio A is area %, and the units of P/V are $kW/m^3$.

Table 2 sets out the fixing ratio of silica fine particles of Toners 1 to 30.

TABLE 2

| Toner | Silica fixing ratio (%) |
|---|---|
| Toner 1 | 89 |
| Toner 2 | 82 |
| Toner 3 | 87 |
| Toner 4 | 80 |
| Toner 5 | 83 |
| Toner 6 | 79 |
| Toner 7 | 94 |
| Toner 8 | 87 |
| Toner 9 | — |
| Toner 10 | 73 |
| Toner 11 | 80 |
| Toner 12 | 79 |
| Toner 13 | 75 |
| Toner 14 | 84 |
| Toner 15 | 82 |
| Toner 16 | 80 |
| Toner 17 | 78 |
| Toner 18 | 72 |
| Toner 19 | 81 |
| Toner 20 | 71 |
| Toner 21 | 72 |
| Toner 22 | 73 |
| Toner 23 | 70 |
| Toner 24 | 70 |
| Toner 25 | 38 |
| Toner 26 | 80 |
| Toner 27 | 81 |
| Toner 28 | 45 |
| Toner 29 | 63 |
| Toner 30 | 87 |

Example 1

Toner 1 was evaluated as follows. The evaluation results are given in Table 3-1 and Table 3-2.

Herein 150 g of Toner 1 were filled into a cartridge (CF230X) for a printer (LaserJet Pro M203dw, by The Hewlett-Packard Company), and the following evaluations were performed. Further, Business 4200 (by Xerox Corporation) having a basis weight of 75 $g/m^2$ was used as evaluation paper utilized for testing.

Fogging on Drum Dr

Firstly the above main body and the cartridge were allowed to stand for 5 days in a high-temperature, high-humidity environment (HH) (32.5° C., 80% RH). The following evaluations were carried out after standing.

Fogging was measured using a REFLECTMETER MODEL TC-6DS by Tokyo Denshoku Co., Ltd. A green filter was used as the filter. To assess fogging on the drum, firstly a Mylar tape was affixed to, and stripped off, the drum (electrostatic latent image bearing member), for a white image immediately following output of a solid black image, and the reflectance of the Mylar tape affixed to paper was measured. Fogging (%) was calculated by subtracting, from that reflectance, a Macbeth density of the Mylar tape directly affixed to the paper. Fogging was then evaluated in accordance with the criteria below.

Fogging (reflectance) (%)=reflectance (%) of tape upon taping on drum−reflectance (%) of tape directly affixed to paper Evaluation Criteria A: less than 5.0%

B: from 5.0% to less than 10.0%

C: from 10.0% to less than 15.0%

D: 15.0% or higher

Evaluation of Transferability after a Durability Test

In a low-temperature, low-humidity environment (15.0° C., 10.0% RH) toner was charged into a cartridge, and a horizontal line image having a print percentage of 1% was printed, over two intermittent sheets, at 1000 prints per day for a total of 5000 prints (5 days). After printing, untransferred toner on the electrostatic latent image bearing member at the time of formation of a solid image, upon adjustment of the transfer current to 8.0 μA was stripped off by taping using a transparent adhesive tape made of polyester (product name: Polyester tape No. 5511, by Nichiban Co., Ltd.).

A respective density difference was calculated by subtracting the density of the stripped adhesive tape affixed to paper from the density of the adhesive tape alone affixed to paper. Density was measured using a REFLECTMETER MODEL TC-6DS by Tokyo Denshoku Co., Ltd. A green filter was used as the filter.

Evaluation Criteria

A: density difference smaller than 5.0

B: density difference from 5.0 to less than 10.0

C: density difference from 10.0 to less than 15.0

D: density difference of 15.0 or larger

Evaluation of Development Streaks in Very Low Temperature Environments

After printing of 5000 prints in the above repeated use test, a solid black image was outputted, and the occurrence or absence of vertical streaks derived from melt adhesion of toner onto a control member i.e. so-called development streaks, was ascertained visually every 100 prints. It is considered that melt adhesion is prone to occur in that toner cooling becomes more abrupt the larger is the difference between the temperature at the time of printing and the temperature of ambient air; hence, the evaluation was performed at a very low temperature (5° C., 30% RH).

Evaluation Criteria

A: no occurrence even at 2000 prints

B: occurrence at from 1100 prints to 2000 prints

C: occurrence at from 500 prints to 1000 prints

D: occurrence at 400 or fewer prints

Examples 2 to 9 and 11 to 24, Comparative Examples 1 to 6

The same evaluations as in Example 1 were performed herein, but modifying Toner 1 to the respective toners set out in Table 3-1 and Table 3-2. The evaluation results are given in Table 3-1 and Table 3-2.

Example 10

The same evaluations as in Example 1 were performed herein, but using a commercially available printer of a non-magnetic single-component developing system (product name: MFC-9840-CDW, by Brother Industries, Ltd.), as the evaluation machine. The evaluation results are given in Table 3-1 and Table 3-2.

TABLE 3-1

| | Toner | HH Fogging | Transferability after durability test | Development streaks |
|---|---|---|---|---|
| Example 1 | Toner 1 | A (1.0) | A (1.0) | A (—) |
| Example 2 | Toner 2 | A (1.5) | A (3.2) | A (—) |
| Example 3 | Toner 3 | A (1.0) | A (3.8) | A (—) |
| Example 4 | Toner 4 | A (1.8) | B (6.3) | B (1800) |
| Example 5 | Toner 5 | A (1.5) | A (2.0) | A (—) |
| Example 6 | Toner 6 | A (3.0) | A (1.6) | A (—) |
| Example 7 | Toner 7 | A (2.1) | B (7.1) | B (1200) |
| Example 8 | Toner 8 | B (5.5) | A (4.5) | A (—) |
| Example 9 | Toner 9 | B (6.7) | B (7.5) | B (1500) |
| Example 10 | Toner 10 | B (9.0) | B (6.1) | B (1700) |
| Example 11 | Toner 11 | A (4.5) | B (6.5) | B (1400) |
| Example 12 | Toner 12 | B (7.9) | B (7.0) | C (800) |
| Example 13 | Toner 13 | B (8.4) | B (9.0) | B (1100) |
| Example 14 | Toner 14 | B (6.8) | B (7.4) | C (700) |
| Example 15 | Toner 15 | C (12.1) | B (8.8) | B (1300) |

TABLE 3-2

| | Toner | HH Fogging | Transferability after durability test | Development streaks |
|---|---|---|---|---|
| Example 16 | Toner 16 | C (10.4) | B (8.6) | B (1200) |
| Example 17 | Toner 17 | C (12.5) | B (7.5) | C (900) |
| Example 18 | Toner 18 | C (14.2) | B (9.1) | C (800) |
| Example 19 | Toner 19 | C (13.2) | C (12.6) | C (800) |
| Example 20 | Toner 20 | C (13.5) | B (8.8) | C (900) |
| Example 21 | Toner 21 | C (13.6) | B (7.7) | C (600) |
| Example 22 | Toner 22 | C (13.8) | C (11.8) | C (600) |
| Example 23 | Toner 23 | C (14.1) | C (13.7) | C (600) |
| Example 24 | Toner 24 | C (14.5) | C (13.5) | C (500) |
| Comparative example 1 | Toner 25 | D (18.2) | C (14.5) | D (300) |
| Comparative example 2 | Toner 26 | C (13.9) | D (17.8) | D (100) |
| Comparative example 3 | Toner 27 | D (24.2) | C (13.2) | C (900) |
| Comparative example 4 | Toner 28 | C (11.5) | D (19.1) | D (400) |
| Comparative example 5 | Toner 29 | C (10.2) | D (17.3) | C (600) |
| Comparative example 6 | Toner 30 | B (6.3) | B (5.4) | D (400) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-099401, filed Jun. 8, 2020, which is hereby incorporated by reference herein in its entirety.

What is claimed is:

1. A method for producing a toner comprising a toner particle comprising a binder resin, and having an external additive, the method comprising the steps of:

dispersing the toner particle and an inorganic dispersant in an aqueous medium to obtain an aqueous dispersion of the toner particle;

adding the external additive to the aqueous dispersion; and fixing the external additive to the toner particle in the aqueous dispersion, wherein the toner particle dispersion is held at a temperature of T1 (° C.) for at least 15 minutes during or after the step of adding, or during or after the step of fixing, where Tg−10° C.<T1<Tg+25° C. and Tg (° C.) is the glass transition temperature of the toner particle, and in the step of dispersing, a coverage ratio of the inorganic dispersant relative to the surface of the toner particle that is dispersed in the toner particle dispersion is 20 to 50 area %.

2. The method for producing a toner of claim 1, wherein the inorganic dispersant has a volume-basis median diameter of 30 to 200 nm.

3. The method for producing a toner of claim 1, wherein the external additive has primary particles with a number-average particle diameter of 100 to 300 nm.

4. The method for producing a toner of claim 1, wherein in the step of dispersing $A \times B \leq 7000$, where A (area %) is a coverage ratio of the inorganic dispersant relative to the surface of the toner particle that is dispersed in the toner particle dispersion, and B (nm) is a number-average particle diameter of primary particles of the external additive.

5. The method for producing a toner of claim 1, wherein the inorganic dispersant comprises an inorganic salt.

6. The method for producing a toner of claim 1, wherein the inorganic dispersant comprises a polyvalent metal salt of phosphoric acid.

7. The method for producing a toner of claim 1, wherein the external additive comprises (i) an inorganic fine particle or (ii) an organic-inorganic composite fine particle containing said inorganic fine particle and an organic fine particle, and the inorganic fine particle is at least one member selected from the group consisting of a silica fine particle, an alumina fine particle, a titania fine particle, a strontium titanate fine particle and a complex oxide fine particle thereof.

8. The method for producing a toner of claim 1, wherein the step of adding and fixing is carried out with a stirring device that delivers high shear forces, the stirring device being provided inside a vessel, and $10<P/V<110$ and $P=1.05\times(f/60)^3\times(d/1000)^5$ where V ($m^3$) is a volume of liquid present in the vessel, P(KW) is power used by the stirring device, d (mm) is a blade diameter of a stirring blade, and f (rpm) is a rotational speed of the blade in the stirring device.

9. The method for producing a toner of claim 1, wherein the external additive is silica fine particles.

10. The method for producing a toner of claim 1, wherein the aqueous medium contains an organic solvent in a content of 10 mass % or less based on a total mass of the aqueous medium; and the aqueous medium contains a surfactant in a content of 0.01 mass % or less based on a total mass of the aqueous medium.

11. The method for producing a toner of claim 1, wherein the aqueous medium contains an organic solvent in a content of 1 mass % or less based on a total mass of the aqueous medium; and the aqueous medium contains a surfactant in a content of 0.0001 mass % or less based on a total mass of the aqueous medium.

12. The method for producing a toner of claim 1, wherein the aqueous medium does not contain any organic solvent.

13. The method for producing a toner of claim 1, wherein the aqueous medium does not contain any surfactant.

14. The method for producing a toner of claim 1, wherein the aqueous medium does not contain any organic solvent, and does not contain any surfactant.

* * * * *